United States Patent
Chen et al.

(10) Patent No.: US 6,497,925 B1
(45) Date of Patent: *Dec. 24, 2002

(54) SURFACE TREATMENT ON SOLGEL COATED SUBSTRATE TO IMPROVE GLIDE HEIGHT PERFORMANCE

(75) Inventors: Ga-Lane Chen, Fremont, CA (US); Simon Wing-Tat Fung, Fremont, CA (US); Hong-Ying Wang, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 231 days.

This patent is subject to a terminal disclaimer.

(21) Appl. No.: 09/612,319

(22) Filed: Jul. 7, 2000

Related U.S. Application Data

(60) Provisional application No. 60/170,830, filed on Dec. 14, 1999.

(51) Int. Cl.[7] .............................. B05D 5/00; B05D 5/02; B05D 3/06; B05D 3/12; C08J 7/18
(52) U.S. Cl. ........................ 427/515; 427/553; 427/581; 427/130; 427/131; 427/127; 216/66
(58) Field of Search ................................. 427/515, 553, 427/554, 555, 581, 130, 162, 226, 127, 128, 129, 131, 132; 216/65, 66

(56) References Cited

U.S. PATENT DOCUMENTS

| | | | | |
|---|---|---|---|---|
| 5,087,482 A | * | 2/1992 | Kawai et al. | 427/131 |
| 5,234,556 A | * | 8/1993 | Oishi et al. | 427/567 |
| 5,389,398 A | * | 2/1995 | Suzuki et al. | 427/130 |
| 5,498,512 A | | 3/1996 | James et al. | |
| 5,525,520 A | | 6/1996 | Dinh | |
| 5,629,888 A | | 5/1997 | Saito et al. | |
| 5,702,793 A | | 12/1997 | Shimokawa et al. | |
| 5,738,806 A | * | 4/1998 | Momose et al. | 427/131 |
| 5,738,932 A | | 4/1998 | Kondo et al. | |
| 5,856,008 A | * | 1/1999 | Cheong et al. | 427/129 |
| 5,942,376 A | * | 8/1999 | Uchida et al. | 427/555 |
| 6,120,836 A | * | 9/2000 | Usuki | 427/131 |

* cited by examiner

*Primary Examiner*—Marianne Padgett
(74) *Attorney, Agent, or Firm*—Morrison & Foerster LLP

(57) ABSTRACT

A substrate for ultra high-density GMR recording is produced by patterning a solgel layer on the substrate. The resulting recording medium is capable of providing a controlled movement of the head on the substrate of a magnetic disk and exhibits improved flying stability, glide performance, reliability, tribology and long term durability for providing zero glide hits.

9 Claims, 3 Drawing Sheets

SURFACE TREATMENT ON SOLGEL COATED SUBSTRATE TO IMPROVE GLIDE HEIGHT PERFORMANCE

RELATED APPLICATIONS

This application claims priority from Provisional Application Ser. No. 60/170,830 filed Dec. 14, 1999, entitled "SURFACE TREATMENT ON SOLGEL COATED GLASS TO IMPROVE GLIDE HEIGHT PERFORMANCE," the entire disclosure of which is hereby incorporated herein by reference.

CROSS-REFERENCE TO RELATED APPLICATIONS

This application discloses subject matter related to subject matter disclosed in co-pending U.S. patent applications: Ser. No. 09/496,341, filed on Feb. 2, 2000; Ser. No. 09/634,253, filed Aug. 7, 2000; Ser. No. 09/612,319, filed on Jul. 7, 2000; Ser. No. 09/433,377, filed on Nov. 3, 1999; Ser. No. 09/433,375, filed on Nov. 3, 1999; Ser. No. 60/109,230, filed on Nov. 18, 1998; Ser. No. 09/433,378, filed on Nov. 3, 1999; and Ser. No. 09/421,393, filed on Oct. 20, 1999, incorporated herein by reference.

FIELD OF INVENTION

The present invention relates to the recording, storage and reading of magnetic data, particularly rotatable recording media, such as thin film magnetic disks having smooth surfaces for data zone. The invention has particular applicability to high density recording media exhibiting low noise and having improved flying stability, glide performance and head-media interface reliability for providing zero glide hits.

BACKGROUND

Magnetic disks and disk drives are conventionally employed for storing data in magnetizable form. Typically, one or more disks are rotated on a central axis in combination with data transducing heads positioned in close proximity to the recording surfaces of the disks and moved generally radially with respect thereto. Magnetic disks are usually housed in a magnetic disk unit in a stationary state with a magnetic head having a specific load elastically in contact with and pressed against the surface of the disk.

Data are written onto and read from a rapidly rotating recording disk by means of a magnetic head transducer assembly that flies closely over the surface of the disk. It is considered desirable during reading and recording operations to maintain each transducer head as close to its associated recording surface as possible, i.e., to minimize the flying height of the head. This objective becomes particularly significant as the areal recording density increases. The areal density (Mbits/in$^2$) is the recording density per unit area and is equal to the track density (TPI) in terms of tracks per inch times the linear density (BPI) in terms of bits per inch.

The increasing demands for higher areal recording density impose increasingly greater demands on flying the head lower because the output voltage of a disk drive (or the readback signal of a reader head in disk drive) is proportional to 1/exp(HMS), where HMS is the space between the head and the media. Therefore, a smooth recording surface is preferred, as well as a smooth opposing surface of the associated transducer head, thereby permitting the head and the disk to be positioned in closer proximity with an attendant increase in predictability and consistent behavior of the air bearing supporting the head.

In recent years, considerable effort has been expended to achieve high areal recording density. Among the recognized significant factors affecting recording density are magnetic remanance (Mr), coercivity, coercivity squareness (S*), signal/noise ratio, and flying height, which is the distance at which a read/write head floats above the spinning disk. Prior approaches to achieve increased areal recording density for longitudinal recording involve the use of dual magnetic layers separated by a non-magnetic layer as in Teng et al., U.S. Pat. No. 5,462,796, and the use of a gradient magnetic layer interposed between two magnetic layers as in Lal et al., U.S. Pat. No. 5,432,012.

However, the goal of achieving a rigid disk recording medium having an areal recording density of about 100 Gb/in$^2$ has remained elusive. In particular, the requirement to further reduce the flying height of the head imposed by increasingly higher recording density and capacity renders the disk drive particularly vulnerable to head crash due to accidental glide hits of the head and media. To avoid glide hits, an accurately controlled movement of the head and a smooth surface of data zone are desired.

Conventional methods for accurately controlling the movement of the head use servo writers. Servo writer is a device which write "servo pattern" on the disk surface.

Conventional techniques for producing a smooth surface on the disk include polishing and tape burnishing (buffing). See, for example, Nakamura et al., U.S. Pat. No. 5,202,810 and Bornhorst et al., U.S. Pat. No. 4,430,782. Typically, the polishing is done using a slurry and buffing is done after sputtering. However, these conventional techniques are attendant with numerous disadvantages. For example, it is extremely difficult to provide a clean and smooth surface due to debris formed by mechanical abrasions.

There exists a need for a recording medium having an areal recording density in excess of 10 Gb/in$^2$, such as in the 20 Gb/in$^2$ range, preferably up to 400 Gb/in$^2$, exhibiting high coercivity and coercivity squareness and a relatively low Mrt (magnetic remanance x thickness), which could be employed for hard disk drives using GMR (giant magnetoresistance) heads. For a GMR media, there exists a need to reduce the fly height to below 1 microinch (25 nm) with zero glide hits.

Disk glide height test (glide hits, glide avalanche), head fly height, and recording performance (output voltage, half peak height PW50, signal-to-noise ratio SNR) are sensitive to the spacing between the head and media. Also, the conventional servo writers have a TPI (tracks per inch) limit. The limit of TPI of conventional servo writers is about 50 KTPI. Exceeding this limit causes inaccurate position of head, i.e. head cannot fly accurately on the desired track.

Accordingly, there exists a need for a system capable of providing a controlled movement of the head on the substrate of a magnetic disk, thereby providing zero glide hits to enhance the reliability, tribology and long term durability of the data storage device.

SUMMARY OF THE INVENTION

An object of the present invention is a recording medium comprising a substrate having a surface of data zone with an embossed pattern on a solgel layer on the substrate to provide Pattern Assisted Magneto-Recording (PAMR) media. The PAMR media is capable of providing zero glide hits, enhanced head-media interface reliability, tribology and glide performance of the head. Solgel is a $SiO_2$-containing material capable of forming a thin film on a substrate. The thickness of the thin film that forms a sol gel layer could be in the range of a few angstroms to a few millimeters. A "servo pattern" could be formed on a solgel surface. A stamper could be used to emboss the patterns on the solgel layer. The pattern could be a combination of dots, lines, and grooves in either radial direction, or circumferential direction, or spiral direction. The pattern could help the recording head and actuator to search for the position of sectors and tracks.

Another object of the invention is a method of preparing the PAMR media.

Additional advantages and features of this invention will be set forth in part in the description that follows and in part will become apparent to those having ordinary skill in the art upon examination of the following description and from the knowledge gained by practicing the invention. The advantages of this invention may be realized and obtained and are particularly pointed out in the claims.

According to the present invention, the foregoing and other objects are achieved in part by a recording medium comprising a substrate and a solgel layer on the substrate, wherein the solgel layer comprises a pattern.

Another embodiment is a recording medium comprising a substrate and a pattern-assisted means for controlled movement of a head of the recording medium on the substrate. The pattern-assisted means for controlled movement of the head could be a pattern on the surface of the substrate. The pattern is not limited to any particular shape or size. One embodiment of the pattern-assisted means is a solgel layer having a pattern. The pattern could be made by embossing, photolithography, or magnetic film etching, or substrate etching.

Another aspect of the invention is a method of surface treating a substrate of a recording medium, comprising forming a solgel layer on the substrate and patterning the solgel layer.

Additional advantages of this invention will become readily apparent to those skilled in this art from the following detailed description, wherein only the preferred embodiments of this invention is shown and described, simply by way of illustration of the best mode contemplated for carrying out this invention. As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

Figure 1:
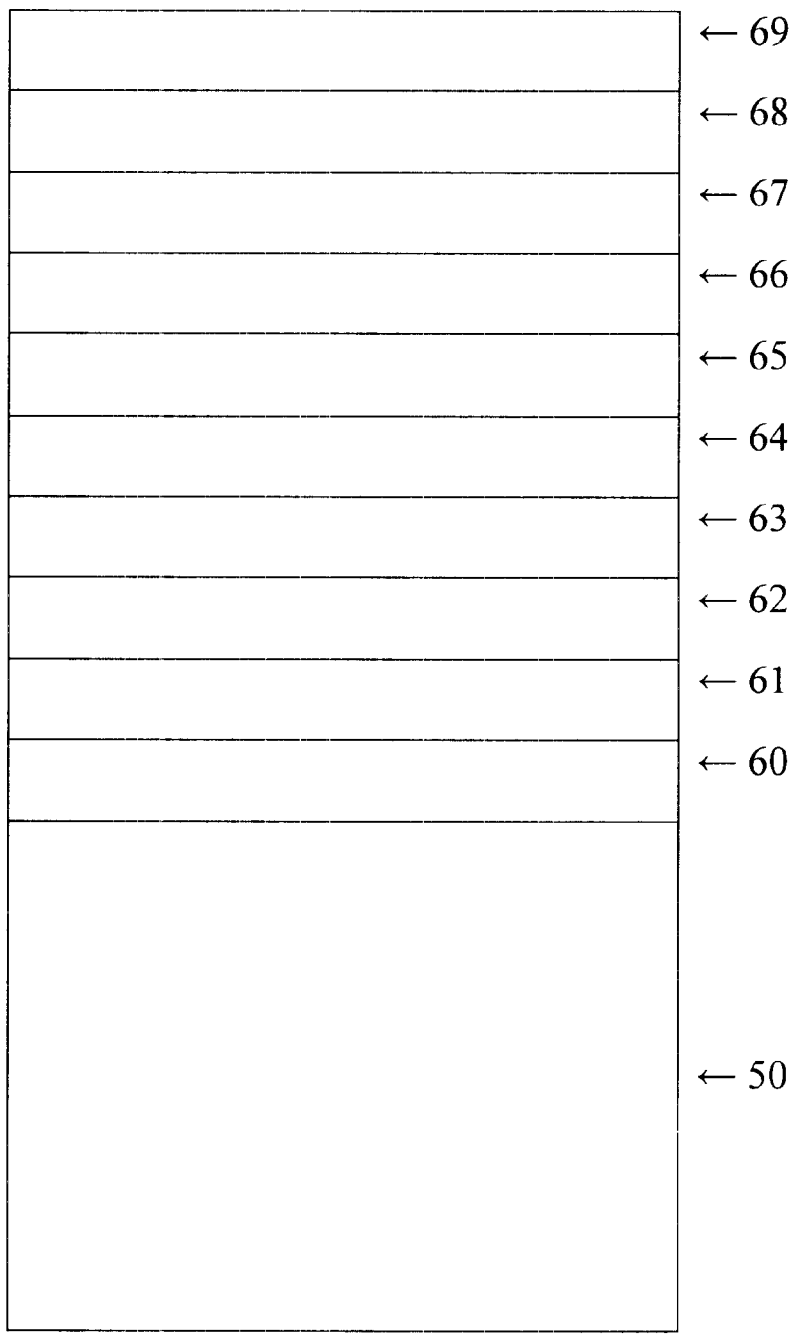
FIG. 1 is the cross section view of solgel glass disk with GMR media.

While conventional methods use servo-writer to create magnetic patterns on the disk surface, this invention uses a pre-format method on the substrate to increase the density of tracks with high resolution. By creating very small patterns on the substrate, the track density could be increased beyond current TPI.

In one embodiment of this invention, the patterns are formed on a solgel layer on the substrate. The solgel layer could be coated on the substrate by a spin-coating process. A stamper could be used to emboss the patterns on the solgel layer. The patterns represent the layout of the servo sectors and tracks. The thickness of the solgel layer could be in the range of 0.3 to 1 $\mu$m. After stamping, the solgel layer could be sintered. Then, surface treatment techniques, e.g., polishing, which include Zap-cutting and photo-ozone treating on the disk, could be applied on the solgel layer. Then, sputtered multilayer thin films could be deposited on both sides of the solgel layer.

In accordance with one embodiment of this invention, a method of surface treating the solgel layer comprises providing the substrate with the solgel layer, applying a moving tape to a surface of the substrate to produce a semi-smooth surface and exposing the semi-smooth surface to photon ozone to produce a smooth surface.

In accordance with one embodiment of this invention, a method of surface treating the solgel layer comprises providing the substrate with the solgel layer, applying a polishing means for cutting asperity to a surface of the substrate to produce a semi-smooth surface and exposing the semi-smooth surface to photon ozone to produce a smooth surface.

In accordance with one embodiment of this invention, a recording medium is formed by a process comprising providing the substrate, applying a solgel layer on the substrate, patterning the solgel layer, applying a moving tape to the solgel layer to produce a semi-smooth surface and exposing the semi-smooth surface to photon ozone to produce a smooth surface.

Variations of the above embodiments include embodiments wherein the smooth surface has a $R_{max}$ value of less than 5 nm and a $R_a$ value of less than 1 nm.

In other embodiments, the substrate comprises a textured area, the tape comprises a slurry, and the slurry comprises ceramic particles.

In other embodiments, the smooth surface has a smoothness such that the substrate could be employed for a hard disk drive using a giant magnetoresistive head.

In other embodiments, the semi-smooth surface has a maximum difference in height between the highest and lowest points on the semi-smooth surface relative to a mean plane of less than 10 nm, preferably less than 7 nm, most preferably less than 5 nm or the smooth surface has a maximum difference in height between the highest and lowest points on the smooth surface relative to a mean plane of less than 5 nm, preferably less than 4 nm, most preferably less than 3 nm.

In other embodiments, the moving tape is applied to the surface with a roller forcing the tape to contact the surface or there is an additional wiping process.

This invention uses a surface treatment technique called "ZP" process comprising zap cutting of the surface of the substrate and photon ozone treatment of the surface. Zap cutting is used for cutting the asperity of the surface of the substrate. The zap cutting process could be used before thin film sputter deposition on the surface of the substrate. The method of this invention could be used on a substrate comprising glass, NiP/aluminum, aluminum alloys, metal alloys, plastic/polymer material, ceramic, glass-ceramic, glass-polymer and other composite materials.

The surface parameters could be measured by atomic force microscope (AFM). The AFM used for this invention has the tradename NanoScope.® The statistics used by the AFM are mostly derived from ASME B46.1 ("Surface Texture: Surface Roughness, Waviness and Law") available from the American Society of Mechanical Engineers, which is incorporated herein by reference.

In particular, the surface parameters are defined as follows:

(1) Average surface roughness ($R_a$): Arithmetic average of the absolute values of the surface height deviations measured from a mean plane. The value of the mean plane is measured as the average of all the Z values within an enclosed area. The mean can have a negative value because the Z values are measured relative to the Z value when the microscope is engaged. This value is not corrected for tilt in the plane of the data; therefore, plane fitting or flattening the data will change this value.

$$R_a = [|Z_1| + |Z_2| + \ldots + |Z_n|]/N$$

(2) RMS: This is the standard deviation of the Z values within the enclosed area and is calculated as $$RMS = [\{\Sigma(Z_i - Z_{avg})^2\}/N]^{1/2}$$

where $Z_{avg}$ is the average of the Z values within the enclosed area, $Z_i$ is the current Z value, and N is the number of points within the enclosed area. The RMS value is not corrected for tilt in the plane of the data; therefore, plane fitting or flattening the data will change this value.

(3) Maximum height ($R_{max}$): This the difference in height between the highest and lowest points on the surface relative to the mean plane.

(4) $R_z$: This is the average difference in height between five highest peaks and five lowest valleys relative to the mean plane.

EXAMPLES

All samples described in this disclosure were fabricated with the ZP process using a glass disk substrate. The typical steps are (1) spin-coating solgel on the substrate to form the solgel layer, (2) patterning the solgel layer by stamping, (3) sintering the solgel layer, (4) zap cutting (or called buff/wipe, or called tape burnishing) the solgel layer and (5) exposing the solgel layer to photon ozone. The photo ozone treatment could be done with an UV light with ozone surrounding the disk.

FIG. 1 shows the configuration of giant magneto-resistance (GMR) media design. This design has the capability to simultaneously improve the magnetic, mechanical and tribological performances of the media. The substrate (50) could be glass, ceramic, glass-ceramic, glass-polymer, aluminum, NiP/aluminum metal alloys, plastic/polymer material, and other composite materials. A spin-coating process was used to coat solgel on a glass substrate and form the solgel layer (60). A stamper was used to emboss the servo pattern on the solgel layer. The thickness of solgel could be in the range of 0.3 to 1 μm. A sintering process was applied on the solgel disk after stamping. Surface treatments, which include Zap-cutting and photo-ozone treating on the disk, were applied on the solgel layer. Then, sputtered multilayer thin films were double-sided coated on both sides of solgel surface.

Multilayer thin films were double-sided coated on both sides of substrates. The first layer (61) is a seed-layer. This layer can control grain size of magnetic layer as well as serve an adhesion layer, which has strong adhesive force on the solgel without delamination. The material is NiAl, NiP, Cr, Ti, CrTi, FeAl, NiTi, NiCr, NiAlOx, etc., or combination thereof The second layer (62) is an oxidation layer or a diffusion barrier layer. This layer has multiple functions for corrosion resistance, passivation and as ion diffusion and/or thermal diffusion barriers. This layer can be formed by putting oxygen in the vacuum chamber (e.g. 80% Ar plus 20% Oxygen) or deposited by reactive sputtering with Ar/Oxygen mixture (e.g. 80/20 mixture) to form NiAlOx, NiPOx, CrOx, TiOx, CrTiOx, FeAlOx, or NiTiOx. This layer also has the function to reduce media noise. The third layer (63) is an underlayer, e.g. CrMo, CrW, CrV, or Cr-alloy materials. The fourth layer (64) is a non-magnetic CoCrx, with x in the range of 34 atomic % to 45 atomic percent. The fifth layer (65) is a flash layer CoCrPtXY with a thickness of about 5 to 25 Å to keep the epitaxial growth of Co (10.0) on Cr (112), where X=Ta, Ni, Mo, Nb, W, and V and Y=B, C, Ta, Mo, Nb and N.

The sixth layer (66) and the seventh are a dual magnetic GMR layer design. The sixth layer (66) has the same or similar composition as the fifth flash layer, i.e. CoCrPtXY, where X=Ta, Ni, Mo, Nb, W, and V and Y=B, C, Ta, Mo, Nb and N. This layer has high concentration of Cr (e.g. 20%) and has very low media noise (i.e. very high SNR). The seventh layer (67) is CoCrPtXY where X=Ta, Ni, Mo, Nb, W, and V and Y=B, C, Ta, Mo, Nb and N. This layer has different composition of alloys but relatively higher saturation moment Ms and magnetic remanance Mr (e.g. <15% Cr, <8% Pt, <6% Ta, <4% B) to give higher signal output. The eighth layer (68) is a foundation layer as well as a corrosion barrier. The material is a dielectric AlNx, SiNx, SiOx, a-CHx, or AlOx. The thickness range is about 5 to 25Å, e.g. 15Å. The ninth layer (69) is a carbon overcoat layer either by sputtering, ion beam deposition, PECVD, or cathodic arc deposition. The material is CNxHy, CNx, or CHx.

The tenth layer (not shown in FIG. 1) is a lubrication layer with a PFPE material, such as MMW Z-Dol, HMW-Zol, AM2001, TX, or Z-Tetraol lube. The lubricant thickness is from 10 Å to 35 Å (e.g. 23 Å). As a result of these layers, this design has improved magnetic, mechanical and tribological performances.

Figure 2:
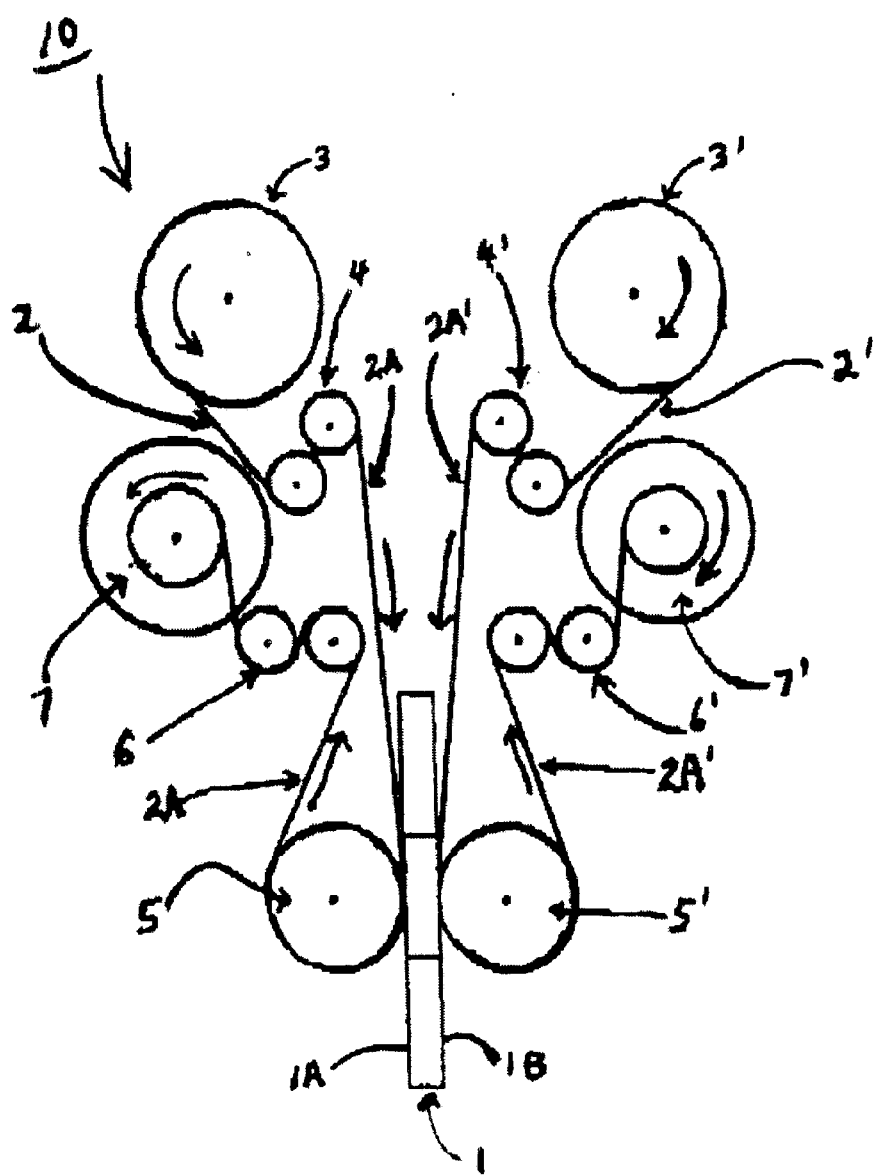
FIG. 2 schematically illustrates a system for zap cutting the substrates of GMR media.

FIG. 2 shows the design of the zap cutting equipment. One of the embodiments of this invention applies contact force on the both sides of disks with roller forcing the tape on the disk with short-term contact. The tape had 0.3 micron alumina slurry on the polyester material. The ceramic slurry was used to cut the asperity of disk surface. The contact force on the disk was 0.8 lb. measured by force gage. The spindle rotation speed of disk was 600 rpm. The tape moving speed was 8 inch per minute. The contact time was three seconds and rest for one second. Then, the contact process was repeated three times. After zap cutting, a wiping process was carried out with a woven fabric polyester material. The wiping time was three second with two pulses with disk rotation speed at 400 rpm and tape speed of 4 inch per minute.

Referring to FIG. 2, shown therein in simplified, cross-sectional schematic view is an illustrative, but not limiting, embodiment of an apparatus 10 adapted for polishing (burnishing) simultaneously on both major surfaces 1A, 1B of a disk-shaped GMR substrate 1 to produce semi-smooth surfaces. The substrate rotates (by means not shown in the drawing for illustrative simplicity) about a central axis perpendicular to the major surfaces 1A, 1B. Moving tapes 2, 2', the respective outer surfaces 2A, 2A' of which are coated with very finely-dimensioned (e.g., 0.3 μm diameter) abrasive particles (e.g., of alumina $Al_2O_3$), are fed from supply rolls or spools 3, 3' via cooperating pairs of guide/idler rollers 4, 4' to be urged against the respective rotating substrate surfaces 1A, 1B with a desired contact force by means of roller drums 5, 5' which are controllably normally loaded (by means not shown for illustrative simplicity) against the substrate surfaces. Following abrasive contact of substrate surfaces 1A, 1B with respective outer tape surfaces 2A, 2A', tapes 2, 2' are fed, via respective pairs of cooperating guide/idler rollers 6, 6' to respective take-up spools or drums 7, 7'. The rotational speed of the substrate 1, the advancement velocity of the tape 2 and the normal load force against the substrate 1 could be varied, for example, with different substrate materials and different asperities of the starting substrate blank material. In addition, the size and nature of the abrasive particles could be selected for use in a particular application.

Apparatus identical or similar to apparatus 10 described above could be utilized for the tape wiping phase or sub-step of the first, tape burnishing step of the inventive method by replacement of abrasive coated tapes 2, 2' with non-abrasive tapes. The operating parameters such as the substrate rotation speed, the tape advancement velocity, and the normal load force during the tape-wiping phase could be essentially the same or different from that used for burnishing the substrate to prepare the semi-smooth surface. In any event, the tape-wiping step could be optimized for use in a particular application.

Figure 3:
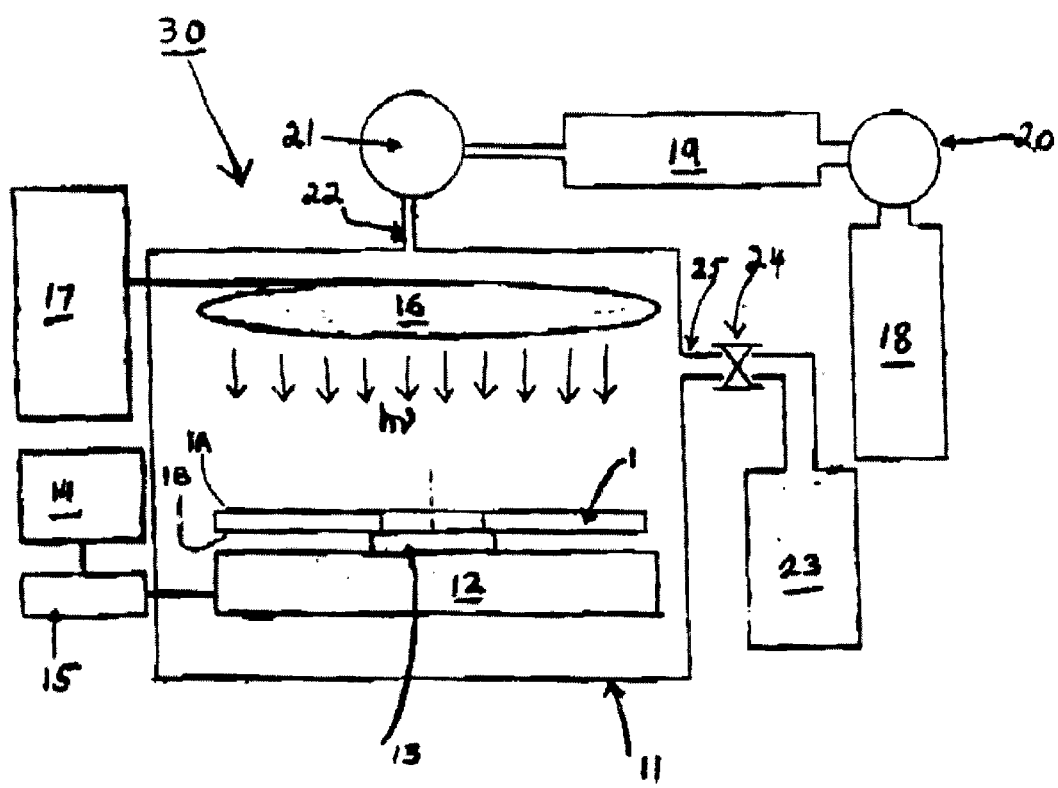
FIG. 3 schematically illustrates a system for photon-ozone treatment of a substrate.

FIG. 3 is the design of the photon-ozone equipment. Oxygen gas with 99.9% purity was used to generate ozone. UV light was used to produce photon treatment with a combination of ozone to strip all of organic, hydrocarbon, moisture, and inorganic debris on the disk surface. The process time was three minutes and 30 seconds. After the photon-ozone process, the system was purged with pure nitrogen before opening the chamber. The UV/ozone stripper is made by Samco Inc. at San Jose, Calif. It has a low pressure Hg discharge lamp that emits at 254 nm (85%) and 185 nm (15%). The illumination intensity is about 50 mW/cm$^2$. The rate of oxygen gas flow used was 0.5 l/min in our experiment. The process was carried out with a flow rate at 11 l/min and achieved the same results.

Referring to FIG. 3, shown therein in simplified, cross-sectional schematic view, is an illustrative, but not limiting, embodiment of an apparatus 30 utilized for performing the second, photon ozone treatment step of the tape burnished/wiped substrate surface(s) 1A, 1B, according to the inventive methodology. As illustrated, photon ozone treatment apparatus 30 comprises chamber 11 having at its lower end an electrically heatable plate 12 including on its upper surface a substrate holder 13 for rotatably mounting disk substrate 1 thereof such that the lower surface thereon (i.e., 1B) is spaced a distance above plate 12 for allowing the latter to be freely in contact with any gas atmosphere present in chamber 11. Power supply 14 and associated temperature controller 15 are electrically connected to heatable plate 12 for controllable regulating the temperature of substrate 1. A source 16 of ultra-violet (UV) radiation, e.g., a high pressure Hg lamp, is positioned at the upper end of chamber 11, facing the upper surface 1A of substrate 1, and is electrically energized via power supply 17. A source 18 of high purity (e.g., 99.9% pure) oxygen ($O_2$) gas is fluidly connected to an ozone ($O_3$) generator 19 (e.g., of conventional electrostatic type) via pressure regulator 20, and ozone generated therein is supplied to the interior of photon ozone treatment chamber 11 via mass flow controller 21 and gas inlet conduit 22. A source 23 of inert gas, e.g., nitrogen ($N_2$) is fluidly connected to chamber 11 for selectively controllable supply thereto via valve 24 and gas inlet conduit 25.

In operation, a disk-shaped substrate 1 is installed on rotatable mount 13 and power supply 14 with temperature controller 15 is energized to heat the substrate to a predetermined temperature. Ozone gas supplied to photon ozone treatment chamber 11 from generator 19 is photochemically activated by UV photons HV supplied from UV radiation source 16. The mass flow rate of ozone as well as the UV flux intensity are not especially critical; however, each should be sufficient as to yield an economically viable product throughout consistent with the requirements of automated mass production technology. While not desiring to be bound by any particular theory, it is believed that oxygen-containing radicals generated by UV-induced photochemical decomposition of ozone ($O_3$) molecules act to clean the abrasively polished surface 1A, 1B of disk substrate 1, thereby removing contaminants and debris therefrom. An inert gas, e.g., nitrogen, is supplied to chamber 11 for an interval after photon ozone treatment in order to purge any remaining traces of reactive, e.g., oxidizing, species prior to removal of the photon ozone treated substrate 1 therefrom, for deposition thereon of the various layers constituting the recording medium. The combination of tape burnishing/wiping and photon ozone treatment, for reasons which are not fully understood, yields a synergistic reduction is substrate surface asperity and roughness, thereby providing substrates with polished surfaces ideally suited for the manufacture of very low glide height GMR media.

By the process of this invention, which include zap-cutting and "UV/Ozone" treatment on the surface of solgel coated glass, the glide height of solgel disks could be reduced from 2 microinches to be below 0.5 microinches. With this two step process on the solgel surface, the asperity and debris of solgel could be cut down and clean surface could be obtained. Glide performance of disk has been improved remarkably, which is allows for high-density recording.

It is important to note that if $R_a$<0.3 nm, the fly height could be less than 0.5 microinch, and with fly height less than 0.5 microinch, areal recording density could be as high as 400 Gb/in$^2$. Thus, the inventive methodology provides a simple, convenient, and rapid process for use in very low glide height, very high recording density media, i.e., as high as 400 Gb/in$^2$, more preferably, more than 100 Gb/in$^2$, and most preferably more than 50 Gb/in$^2$. The roughness of the smooth surface of the substrate is low enough such that topographical features of the surface are not replicated in the various media layers deposited thereover, including the layers proximate the flying head.

In other embodiments of this invention the variations in polishing the surface and the polishing means that could employed are any one or more of the methods shown below.

Mechanical Polishing

Persons skilled in this art would recognize that the variables that control mechanical polishing are:

(1) substrate surface initial condition: roughness, waviness, substrate size, substrate shape and grain size;

(2) polishing slurry size($Al_2O_3$, $CeO_2$, $SiO_2$, etc) and coolant (inorganic and organic solutions with lubricant);

(3) polishing time and surface finishing; and (4) washing and cleaning substrate surface Chemical Polishing Persons skilled in this art would recognize that the variables that control chemical polishing are:

(1) substrate surface initial condition: roughness, waviness, substrate size, substrate shape and grain size;

(2) polishing solutions compositions and their ability to dissolve the substrate materials;

(3) the composition consists of a combination of different acids (e.g. nitric, sulfuric, hydrochloric, phosphoric, chromic, acetic) or organic solutions (e.g. methanol, glycerin, ethyldiglicol), also containing some added electropositive ions. E.g., polishing of Al: small amounts of Cu will create additional local cathodes by deposition on Al, stimulating the polishing process. Adding some oxidants has a function as depolarization agents.

Electrochemical Polishing

Persons skilled in this art would recognize that the variables that control electrochemical polishing are:

(1) The external source of electricity to produce the anodic current density and voltage;

(2) the electrolyte temperature;

(3) the time duration of electropolishing;

(4) the cathodic materials; in general, the cathode surface should be many times larger than that of electropolished substrate. Different materials are used as cathodes depending on the applied electrolyte; and (5) agitation, which could eliminates the undesired concentration of the dissolved material at the substrate. Agitation could improve the supply of fresh electropolishing electrolyte to substrate surface. Agitation could prevent local heating and release gas bubbles from the polished surface to avoid pitting on the substrate surface CMP (Chemical Mechanical Polishing) used in semiconductor wafer polishing. Persons skilled in this art would recognize that the variables that control the CMP process.

In other embodiments, the semi-smooth surface has a $R_a$ value of less than 2 nm, preferably less than 1 nm, most preferably less than 0.5 nm or the smooth surface has a $R_a$ value of less than 1 nm, preferably less than 0.5 nm, most preferably less than 0.25 nm.

In other embodiments, the semi-smooth surface has a RMS value of less than 5 nm, preferably less than 2 nm, most preferably less than 1 nm or the smooth surface has a RMS value of less than 2 nm, preferably less than 1 nm, most preferably less than 0.5 nm.

In other embodiments, the semi-smooth surface has a $R_z$ value of less than 5 nm, preferably less than 2 nm, most preferably less than 1 nm or the smooth surface has a $R_z$ value of less than 2 nm, preferably less than 1 nm, most preferably less than 0.5 nm.

These surface treatment techniques with the ZP processes of this invention give clean substrate surface for lower glide with zero hard hits. They also produce super-clean and defect-free surface for ultra high-density GMR media. The recording media produced by zap cutting and photon ozone treatment are suitable for high-density magnetic recording.

This invention could be used for disk drives using load/unload mechanism, which require the surface roughness to be smooth throughout the whole disk surface. For the disk drives that require CSS test, the surface roughness is generally higher (to avoid stiction) on the laser textured landing zone area than on the data zone area. However, the whole disk could be polished to a very smooth finish using this invention before laser texturing the landing zone.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

What is claimed is:

1. A method of treating a substrate of a recording medium, comprising:

forming a solgel layer on the substrate and patterning the solgel layer with a pattern representing information, wherein the recording medium comprises a magnetic recording layer.

2. The method of claim 1, wherein a thickness of the solgel layer is in the range of about 0.3 to 1 $\mu$m.

3. The method of claim 1, wherein the forming the solgel layer on the substrate is by a spin-coating process.

4. The method of claim 1, wherein the patterning forms a pattern that represents a layout of servo sectors or tracks.

5. A method of treating a substrate of a recording medium comprising, forming a solgel layer on the substrate and patterning the solgel layer, wherein the recording medium comprises a magnetic recording layer and the patterning is by an embossing process.

6. A method of treating a substrate of a recording medium, comprising:

forming a solgel layer on the substrate, patterning the solgel layer, sintering the solgel layer, polishing the solgel layer to produce a first surface and exposing the first surface to ozone produced by activating oxygen by protons to produce a second surface, wherein the recording medium comprises a magnetic recording layer sintering the solgel layer.

7. The method of claim 6, wherein the second surface has a $R_{max}$ value of less than 5 nm and a $R_a$ value of less than 1 nm.

8. The method of claim 6, wherein the first surface has a maximum difference in height between the highest and lowest points on the first surface relative to a mean plane of less than 10 nm.

9. The method of claim 6, wherein the second surface has a maximum difference in height between the highest and lowest points on the second surface relative to a mean plane of less than 5 nm.

* * * * *